(12) United States Patent
Ogawa et al.

(10) Patent No.: US 7,142,233 B1
(45) Date of Patent: Nov. 28, 2006

(54) IMAGE PICKUP ELEMENT

(75) Inventors: Katsuhisa Ogawa, Machida (JP); Shigetoshi Sugawa, Atsugi (JP); Hideyuki Arai, Kawasaki (JP); Isamu Ueno, Hadano (JP); Toru Koizumi, Yokohama (JP); Tetsunobu Kochi, Hiratsuka (JP); Katsuhito Sakurai, Machida (JP); Hiroki Hiyama, Atsugi (JP)

(73) Assignee: Canon Kabushiki Kaishi, Tokyo (JP)

( * ) Notice: Subject to any disclaimer, the term of this patent is extended or adjusted under 35 U.S.C. 154(b) by 0 days.

(21) Appl. No.: 09/210,545

(22) Filed: Dec. 14, 1998

(30) Foreign Application Priority Data

Dec. 26, 1997 (JP) .................................. 9-361096

(51) Int. Cl.
*H04N 5/235* (2006.01)
*H04N 5/228* (2006.01)

(52) U.S. Cl. .................................. 348/222.1; 348/266
(58) Field of Classification Search ................ 358/513; 348/230.1, 222.1, 294, 302, 281
See application file for complete search history.

(56) References Cited

U.S. PATENT DOCUMENTS

| | | | | |
|---|---|---|---|---|
| 4,117,510 A | * | 9/1978 | Ohta et al. .................. 257/231 |
| 4,303,947 A | * | 12/1981 | Stoffel .................... 358/426.03 |
| 4,322,752 A | * | 3/1982 | Bixby .................... 264/177.17 |
| 4,504,865 A | * | 3/1985 | Nishizawa et al. ......... 348/281 |
| 4,658,287 A | * | 4/1987 | Chen .......................... 348/281 |
| 4,660,096 A | * | 4/1987 | Arlan et al. .............. 348/218.1 |
| 4,709,147 A | * | 11/1987 | Arai ............................ 250/234 |
| 4,768,085 A | * | 8/1988 | Hashimoto .................. 348/237 |
| 4,785,353 A | * | 11/1988 | Seim .......................... 348/241 |
| 4,816,910 A | * | 3/1989 | Hashimoto et al. ......... 348/247 |
| 4,835,404 A | * | 5/1989 | Sugawa et al. .............. 250/578 |
| 4,879,470 A | * | 11/1989 | Sugawa et al. .............. 250/578 |
| 4,967,067 A | * | 10/1990 | Hashimoto et al. ....... 250/208.1 |
| 4,972,243 A | * | 11/1990 | Sugawa et al. ............... 357/30 |
| 5,047,844 A | * | 9/1991 | Ikeda et al. .................. 358/521 |
| 5,162,912 A | * | 11/1992 | Ueno et al. ............. 358/213.16 |
| 5,184,006 A | * | 2/1993 | Ueno ....................... 250/208.1 |
| 5,196,939 A | * | 3/1993 | Elabd et al. ................. 348/314 |
| RE34,309 E | * | 7/1993 | Tanaka et al. ......... 258/213.31 |
| 5,262,870 A | * | 11/1993 | Nakamura et al. .......... 358/212 |
| 5,264,945 A | * | 11/1993 | Kannegundla et al. ...... 358/444 |
| 5,285,286 A | * | 2/1994 | Kannegundla .............. 348/187 |
| 5,396,592 A | * | 3/1995 | Fujimoto .................... 345/501 |

(Continued)

FOREIGN PATENT DOCUMENTS

EP 0784397 A 7/1997

(Continued)

OTHER PUBLICATIONS

Color filters and processing alternatives for one-chip cameras (Parulski).*

*Primary Examiner*—Vivek Srivastava
*Assistant Examiner*—Yogesh Aggarwal
(74) *Attorney, Agent, or Firm*—Fitzpatrick, Cella, Harper & Scinto

(57) ABSTRACT

To output a color image signal of an arbitrary basic block and facilitate processing on the output side, an image pickup element including a plurality of photodetectors each having a color filter array, a vertical direction selection circuit for selecting in the vertical direction an arbitrary basic block having at least one of the plurality of photodetectors, a horizontal direction selection circuit for selecting the arbitrary basic block in the horizontal direction, and an output circuit for parallelly outputting outputs from the photodetectors in the arbitrary basic block selected by the vertical direction selection circuit and horizontal direction selection circuit is provided.

5 Claims, 10 Drawing Sheets

U.S. PATENT DOCUMENTS

| | | | |
|---|---|---|---|
| 5,459,520 A * | 10/1995 | Sasaki | 348/222.1 |
| 5,539,196 A * | 7/1996 | Miyawaki et al. | 250/208.1 |
| 5,550,936 A * | 8/1996 | Someya et al. | 348/252 |
| 5,680,335 A * | 10/1997 | Ikeyama et al. | 386/131 |
| 5,693,932 A * | 12/1997 | Ueno et al. | 250/208.1 |
| 5,714,752 A * | 2/1998 | Ueno et al. | 250/208.1 |
| 5,771,031 A * | 6/1998 | Kinoshita et al. | 345/100 |
| 5,861,917 A * | 1/1999 | Tariki et al. | 348/230 |
| 5,867,627 A * | 2/1999 | Nakazato et al. | 38/906 |
| 5,886,343 A * | 3/1999 | Miyawaki et al. | 348/302 |
| 5,920,343 A * | 7/1999 | Watanabe et al. | 348/222.1 |
| 5,943,091 A * | 8/1999 | Wu et al. | 348/164 |
| 5,986,699 A * | 11/1999 | Nishihara | 345/660 |
| 6,014,467 A * | 1/2000 | Asano | 382/250 |
| 6,181,375 B1 * | 1/2001 | Mitsui et al. | 348/240.99 |
| 6,181,376 B1 * | 1/2001 | Rashkovskiy et al. | 348/273 |
| 6,205,259 B1 * | 3/2001 | Komiya et al. | 382/284 |
| 6,230,975 B1 * | 5/2001 | Colley et al. | 235/462.06 |
| 6,295,087 B1 * | 9/2001 | Nohda | 348/234 |
| 6,304,290 B1 | 10/2001 | Bailly | 348/243 |
| 6,346,969 B1 * | 2/2002 | Kwon | 348/273 |
| 6,392,699 B1 * | 5/2002 | Acharya | 348/273 |
| 6,593,965 B1 * | 7/2003 | Miyamoto | 348/280 |
| 6,606,122 B1 * | 8/2003 | Shaw et al. | 348/302 |
| 6,914,628 B1 * | 7/2005 | Kuwata et al. | 348/272 |

FOREIGN PATENT DOCUMENTS

| | | |
|---|---|---|
| JP | 9-200605 | 7/1997 |
| WO | WO 9819270 A | 5/1998 |

* cited by examiner

IMAGE PICKUP ELEMENT

BACKGROUND OF THE INVENTION

1. Field of the Invention

The present invention relates to an image pickup element for outputting an arbitrary image region and an image pickup device for interpolating an arbitrary image region.

2. Related Background Art

In an image pickup device, to obtain a color image from a single image pickup element, light is incident on the image pickup element through color filter arrays. Color filter arrays are roughly classified into a primary color filter array and a complementary color filter array. In a primary color filter array, three filters, i.e., an R filter for transmitting only red light within the visible light range, a G filter for transmitting only green light within the visible light range, and a B filter for transmitting only blue light within the visible light range are arrayed in, e.g., a matrix. In a complementary color filter array, a cyan (to be referred to as "Cy" hereinafter) filter for shielding only red light within the visible light range, a magenta (to be referred to as "Mg" hereinafter) filter for shielding only green light within the visible light range, and a yellow (to be referred to as "Ye" hereinafter) filter for shielding only blue light within the visible light range are arrayed in, e.g., a matrix. There are various color filter array patterns. FIG. 1 shows an example of the primary color filter array. This is called a Bayer matrix.

The Bayer matrix will be described. Of the basic units of the array pattern of 2×2 color filters, only the upper left pixel can directly output a red signal from a photoelectric conversion element as a detection unit of an image pickup element. Only the upper right and lower left pixels can output a green signal, and only the lower right pixel can output a blue signal. To obtain the respective color signals from these pixels, interpolation processing is required. In interpolation, the value of a pixel to be interpolated is obtained by signal processing or calculation based on the values of the neighboring pixels.

FIGS. 2A to 2C are views for explaining an example of interpolation corresponding to the Bayer matrix shown in FIG. 1. Symbol ○ indicates an original pixel obtained from a photoelectric conversion element. Symbol Δ indicates an interpolated pixel obtained by interpolation. An arrow indicates the relationship between an interpolated pixel and its original pixel.

FIG. 3 is a block diagram of a conventional single-plate color image pickup device. Referring to FIG. 3, the device comprises a CCD image pickup element 901, an A/D converter (ADC) 902, a memory 903, an interpolation circuit 904, a signal processing circuit 905, and a D/A converter (DAC) 906. The memory 903 requires a capacity corresponding to the number of bits of at least (two lines+ two pixels)×ADC. The memory 903 is constituted by, e.g., a FIFO having an output terminal at its middle point.

In the CCD image pickup element 901, a photodetection signal obtained by each photoelectric conversion element is transferred in the vertical direction by a CCD and then transferred in the horizontal direction by a CCD. More specifically, when all photodetection signals of a certain line are transferred by the vertical CCD to reach the horizontal CCD, all the photodetection signals are sequentially transferred in the horizontal direction by the horizontal CCD and output from an output terminal. This operation is sequentially performed for all lines. Therefore, photodetection signals (original pixels) are output from the CCD image pickup element 901 in the order of scanning lines, as shown on the CCD image pickup element 901 in FIG. 3.

Each original pixel output from the CCD image pickup element 901 is A/D-converted by the ADC 902 and stored in the memory 903. A plurality of original pixels on each of the first, second, and third lines output from the memory 903 are input to the interpolation circuit 904. The interpolation circuit 904 interpolates as shown in FIGS. 2A to 2C on the basis of these original pixels and outputs RGB signals interpolated by the interpolated pixels. The signal processing circuit 905 processes the RGB signals by color gain adjustment or edge enhancement. The DAC 906 D/A-converts the processed RGB signals to output analog RGB signals.

In the above-described prior art, interpolated pixels must be obtained on the basis of original pixels output from the CCD image pickup element 901 in the order of scanning lines. For this purpose, the ADC 902, memory 903, and DAC 906 are required in addition to the interpolation circuit 904 and signal processing circuit 905, resulting in an increase in circuit scale.

SUMMARY OF THE INVENTION

It is an object of the present invention to provide an image pickup element capable of outputting a signal from a pixel in an arbitrary basic block.

It is an another object of the present invention to provide an image pickup element capable of outputting a signal from a pixel in an arbitrary basic block which is appropriate to calculation of interpolated pixel.

It is an another object of the present invention to provide an image pickup device capable of reducing circuit scale.

It is another object of the present invention to provide an image pickup device capable of obtaining an interpolated pixel without any A/D converter, memory for a plurality of lines, and D/A converter.

In order to achieve the above object, according to an aspect of the present invention, there is provided an image pickup element comprising a plurality of photodetectors each having a color filter array, vertical direction selection means for selecting in a vertical direction an arbitrary basic block having at least two of the plurality of photodetectors, horizontal direction selection means for selecting the arbitrary basic block in a horizontal direction, and output means for parallelly outputting outputs from the photodetectors in the arbitrary basic block selected by the vertical direction selection means and the horizontal direction selection means.

According to another aspect of the present invention, there is provided an image pickup device comprising:
(A) an image pickup element including;
  (a) a plurality of photodetectors each having a color filter array;
  (b) vertical direction selection means for selecting in a vertical direction an arbitrary basic block having at least two of the plurality of photodetectors;
  (c) horizontal direction selection means for selecting the arbitrary basic block in a horizontal direction; and
  (d) output means for parallelly outputting outputs from the photodetectors in the arbitrary basic block selected by the vertical direction selection means and the horizontal direction selection means;
(B) block storage means for storing a plurality of outputs from the image pickup elements in units of basic blocks; and
(C) interpolation means for calculating an interpolated pixel on the basis of an output from the block storage means.

By the image pickup element having the above arrangement, processing on the output side is facilitated.

In addition, by the above image pickup device, the circuit scale can be reduced.

Other objects, features, and advantages of the present invention will be apparent from the following specification and accompanying drawings.

DETAILED DESCRIPTION OF THE PREFERRED EMBODIMENTS

In embodiments to be described below, an image pickup element such as so-called CMOS image pickup element capable of reading a pixel at an arbitrary portion at random is used.

Figure 4:
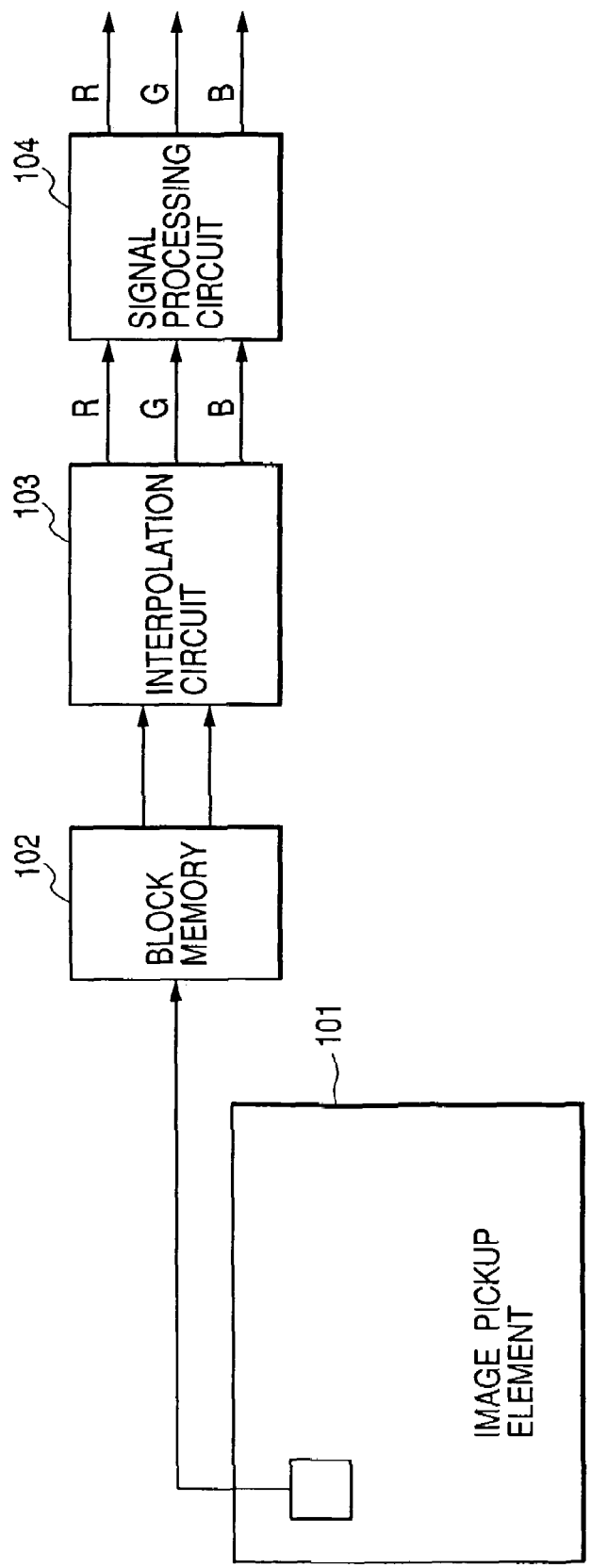
FIG. 4 is a block diagram showing the arrangement of a single-plate color image pickup device according to the present invention.

FIG. 4 is a block diagram showing the arrangement of an image pickup device according to the first embodiment. Referring to FIG. 4, the image pickup device comprises an image pickup element 101, a block memory 102, an interpolation circuit 103, and a signal processing circuit 104.

Figure 1:
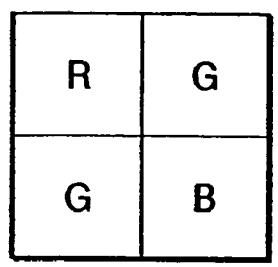
FIG. 1 is a view showing the basic pattern of a color filter array in a Bayer matrix.
Figure 2A:
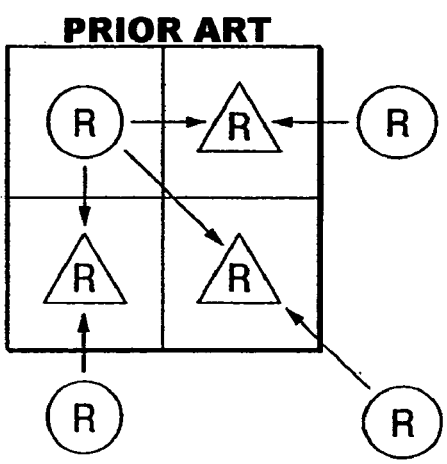
FIGS. 2A, 2B and 2C are views for explaining an example of interpolation of RGB signals corresponding to the Bayer matrix.
Figure 2B:
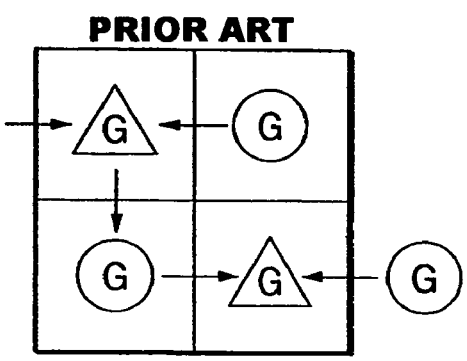
Figure 2C:
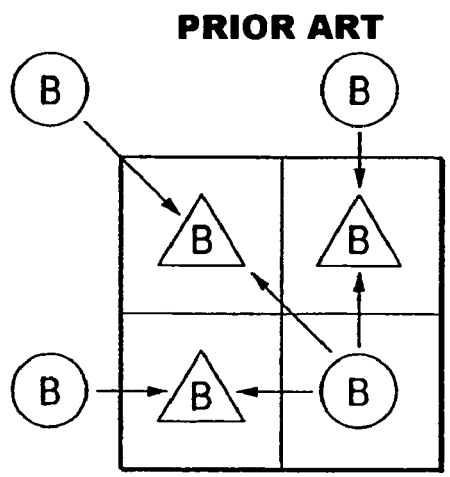
Figure 3:
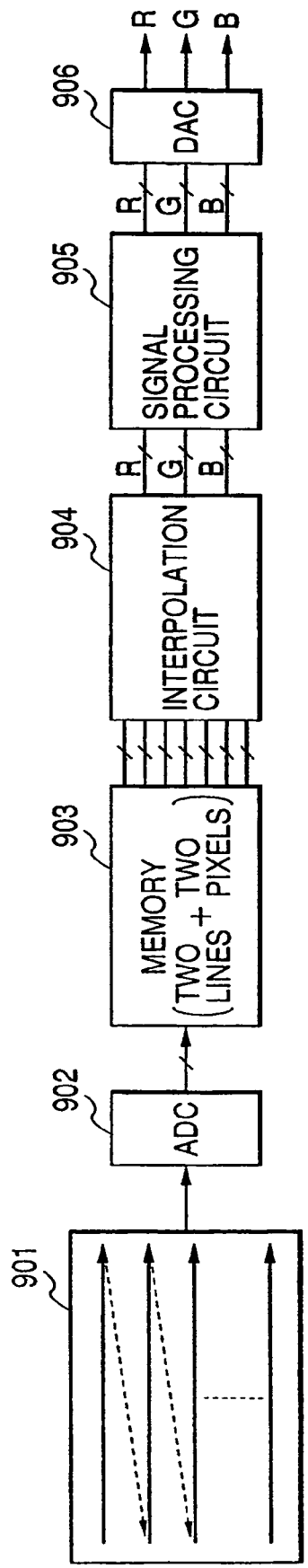
FIG. 3 is a block diagram showing the arrangement of a conventional single-plate color image pickup device.

Original pixels are read from the image pickup element 101 in units of 2×2 basic (minimum) blocks of a Bayer matrix. The block memory 102 stores read original pixels of a plurality of basic blocks. In this embodiment, the block memory 102 stores three basic blocks in the horizontal direction and three basic blocks in the vertical direction, i.e., a total of nine basic blocks. The interpolation circuit 103 interpolates as shown in FIGS. 2A to 2C on the basis of the original pixels stored in the block memory 102 and outputs interpolated RGB signals. The signal processing circuit 104 processes the interpolated RGB signals by color gain adjustment, low-frequency filtering, or edge enhancement and outputs the processed RGB signals. The signals obtained from the image pickup element 101 and output from the signal processing circuit 104 are analog signals.

The block memory 102, interpolation circuit 103, and signal processing circuit 104 are formed on one chip together with the image pickup element 101. For example, when the image pickup element 101 is a CMOS image pickup element, the image pickup element 101, block memory 102, interpolation circuit 103, and signal processing circuit 104 are formed on one chip by the same CMOS process.

Figure 5:
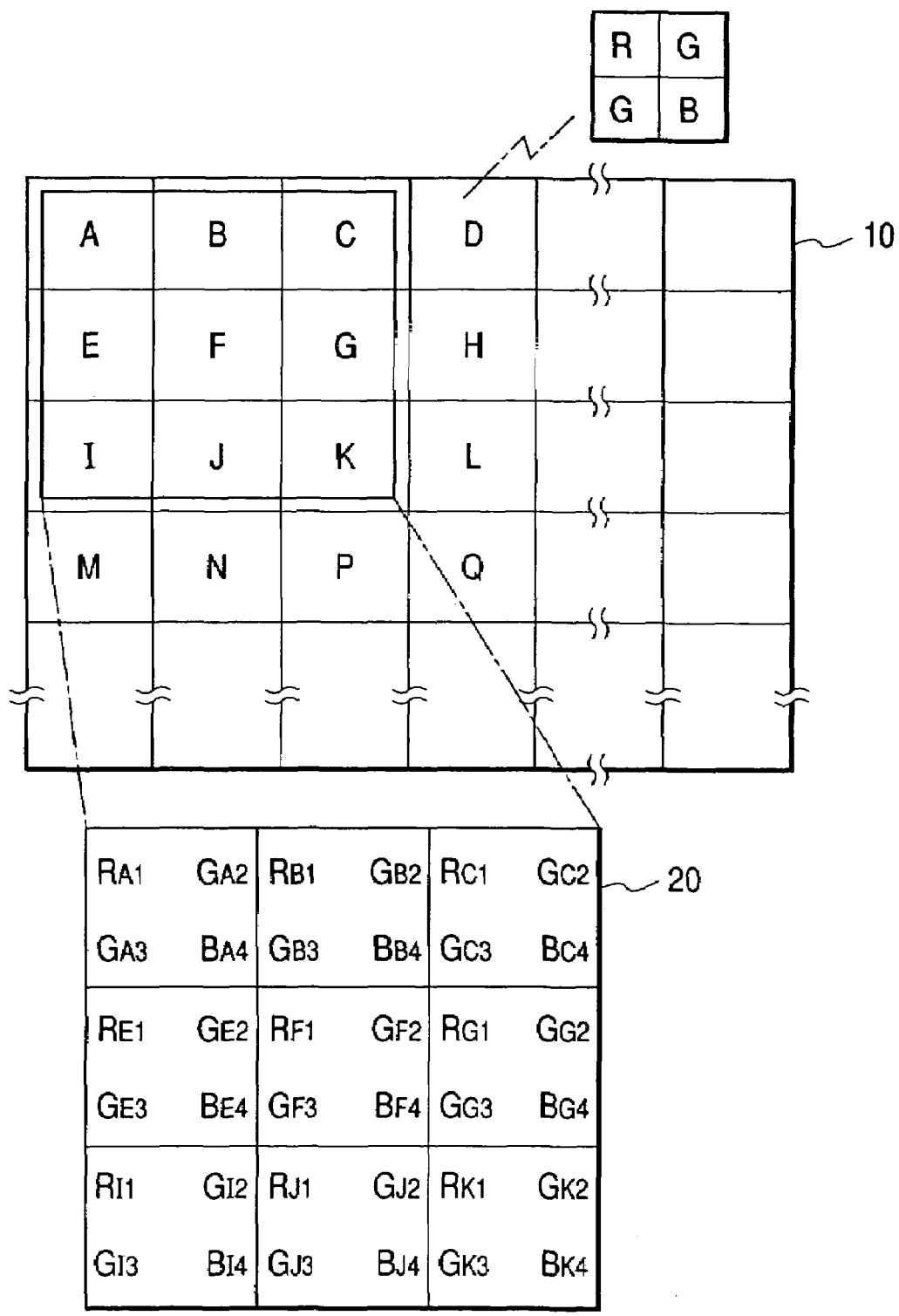
FIG. 5 is a first view for explaining interpolation processing according to the first embodiment of the present invention.

FIG. 5 is a view showing the array of original pixels stored in the block memory 102. Referring to FIG. 5, symbols A, B, C, D, E, F, G, H, I, J, K, L, M, N, P, and Q denote basic blocks. The block memory 102 simultaneously stores 3×3 basic blocks, as indicated by reference numeral 20 in FIG. 5.

Figure 6:
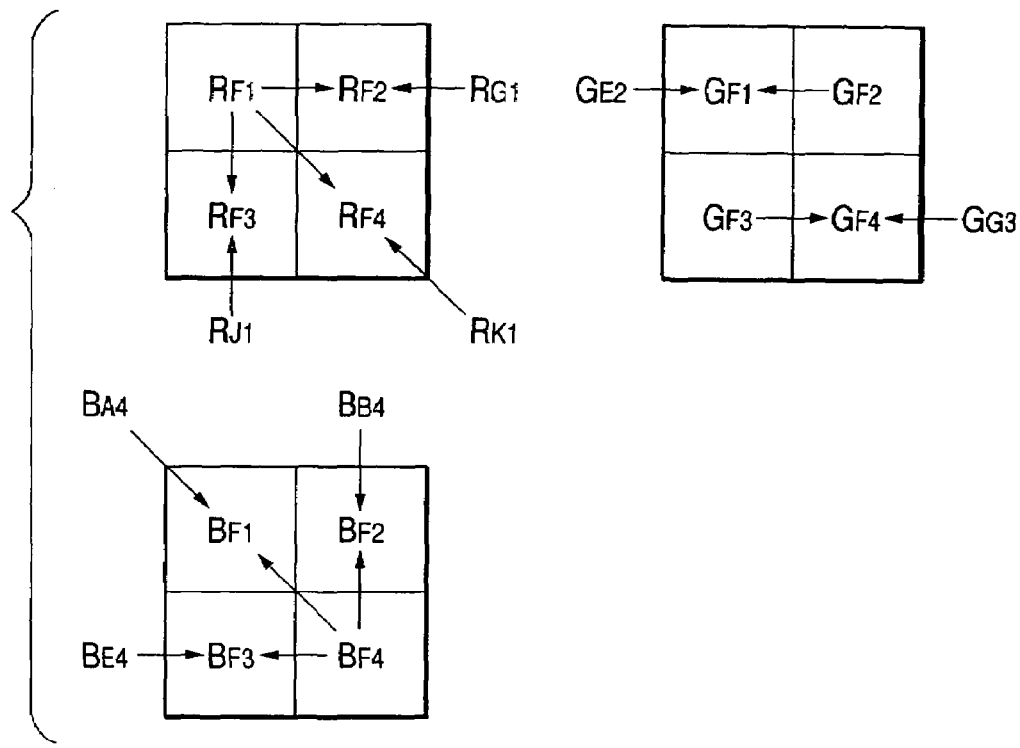
FIG. 6 is a second view for explaining interpolation processing according to the first embodiment of the present invention.

FIG. 6 is a view for explaining interpolation processing by the interpolation circuit 103. The interpolation circuit 103 generates interpolated pixels pointed by arrowheads in FIG. 6 on the basis of the original pixels stored in the block memory 102, which are indicated by reference numeral 20 in FIG. 5, in accordance with the following equations exemplifying the basic block F:

$$R_{F2}=(R_{F1}+R_{G1})/2$$

$$R_{F3}=(R_{F1}+R_{J1})/2$$

$$R_{F4}=(R_{F1}+R_{K1})/2$$

$$G_{F1}=(G_{E2}+G_{F2})/2$$

$$G_{F4}=(G_{F3}+G_{G3})/2$$

$$B_{F1}=(B_{A4}+B_{F4})/2$$

$$B_{F2}=(B_{B4}+B_{F4})/2$$

$$B_{F3}=(B_{E4}+B_{F4})/2$$

When interpolation of the basic block F is complete, the basic blocks D, H, and L are read from the image pickup element 101 and written in the block memory 102. The basic blocks A, E, and I are erased from the block memory 102. The interpolation circuit 103 generates the interpolated pixels of the basic block G on the basis of the original pixels of the basic blocks B, C, D, F, G, H, J, K, and L in the same manner as described above.

By repeating the block reading and interpolation, the interpolation circuit 103 outputs interpolated RGB signals in the order of, e.g., the basic blocks F, G, H, . . . , J, K, L, . . . , N, P, Q, . . . . However, the basic block output order is not limited to this. For example, when block processing such as calculation of the discrete cosine transforms (DCTs) of 8×8 pixels is to be done on the output side of the signal processing circuit, the signals can be read in the order of the basic blocks F, G, J, K, . . . to continuously output 8×8 pixel data. The basic block size may be equal to the block processing size.

An image pickup device according to the second embodiment has the same arrangement as that of the first embodiment shown in FIG. 4. In the second embodiment, a complementary color filter array is used as a color filter array. The arrangement of the image pickup device of the second embodiment is the same as that of the first embodiment shown in FIG. 4, and a detailed description thereof will be omitted.

Figure 7:
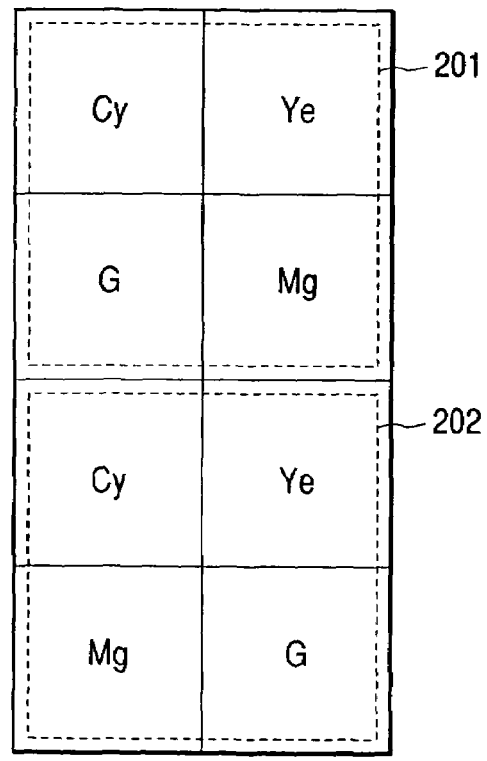
FIG. 7 is a view showing the basic pattern of a complementary color filter array.

FIG. 7 is a view showing the basic pattern of the complementary color filter array in this embodiment. Referring to FIG. 7, the basic pattern has a size of 4 lines×2 pixels.

The basic block size in block reading of this embodiment is the same as in the first embodiment, i.e., 2×2 pixels. The basic pattern of the color filter array is different from the basic block in block reading.

Figure 8:
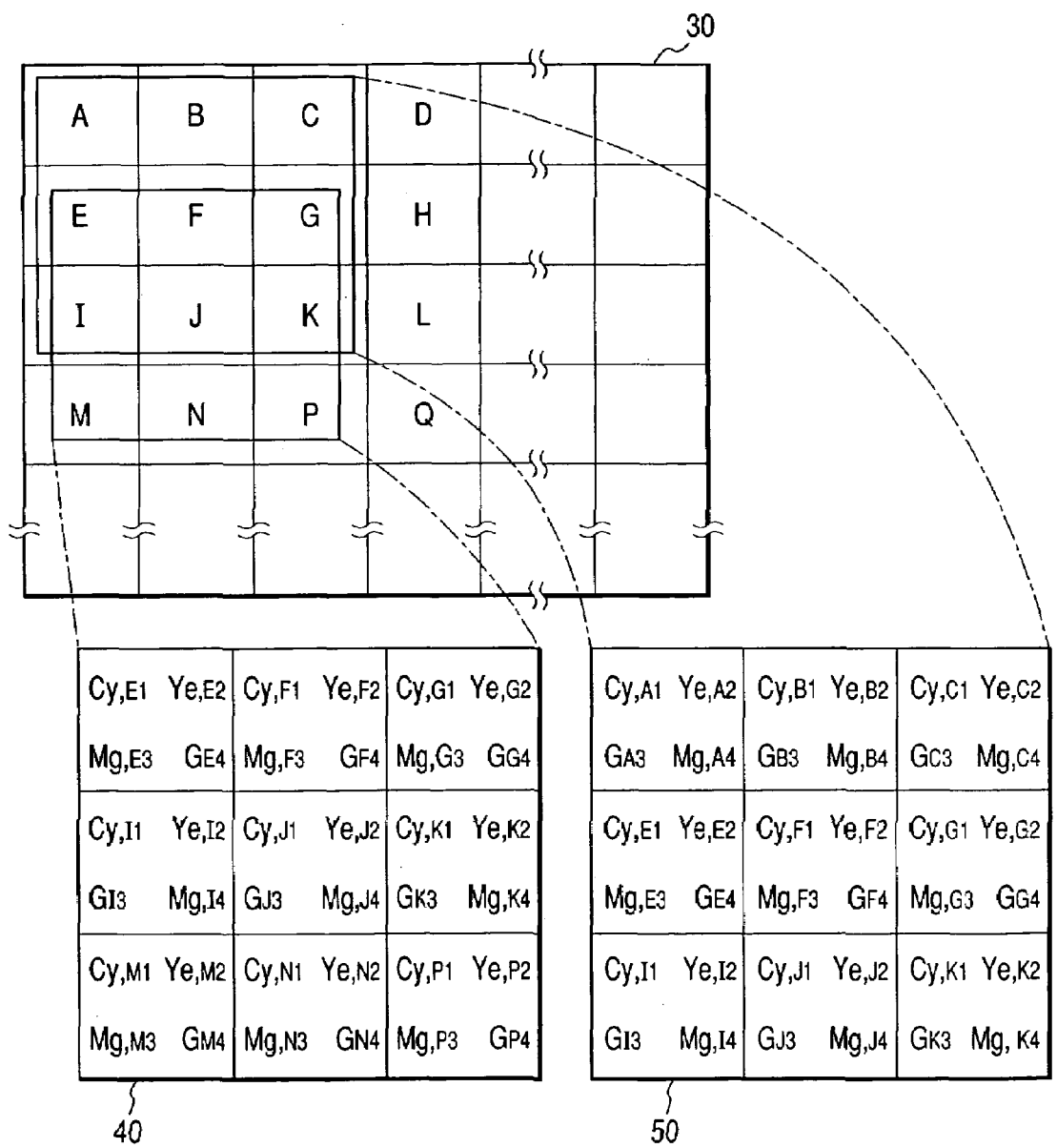
FIG. 8 is a first view for explaining interpolation processing according to the second embodiment of the present invention.

FIG. 8 is a view showing the array of original pixels stored in a block memory 102. Referring to FIG. 8, symbols A, B, C, D, E, F, G, H, I, J, K, L, M, N, P, and Q denote basic blocks. The block memory 102 simultaneously stores 3×3 basic blocks, as indicated by reference numeral 40 or 50 in FIG. 8.

Figure 9:
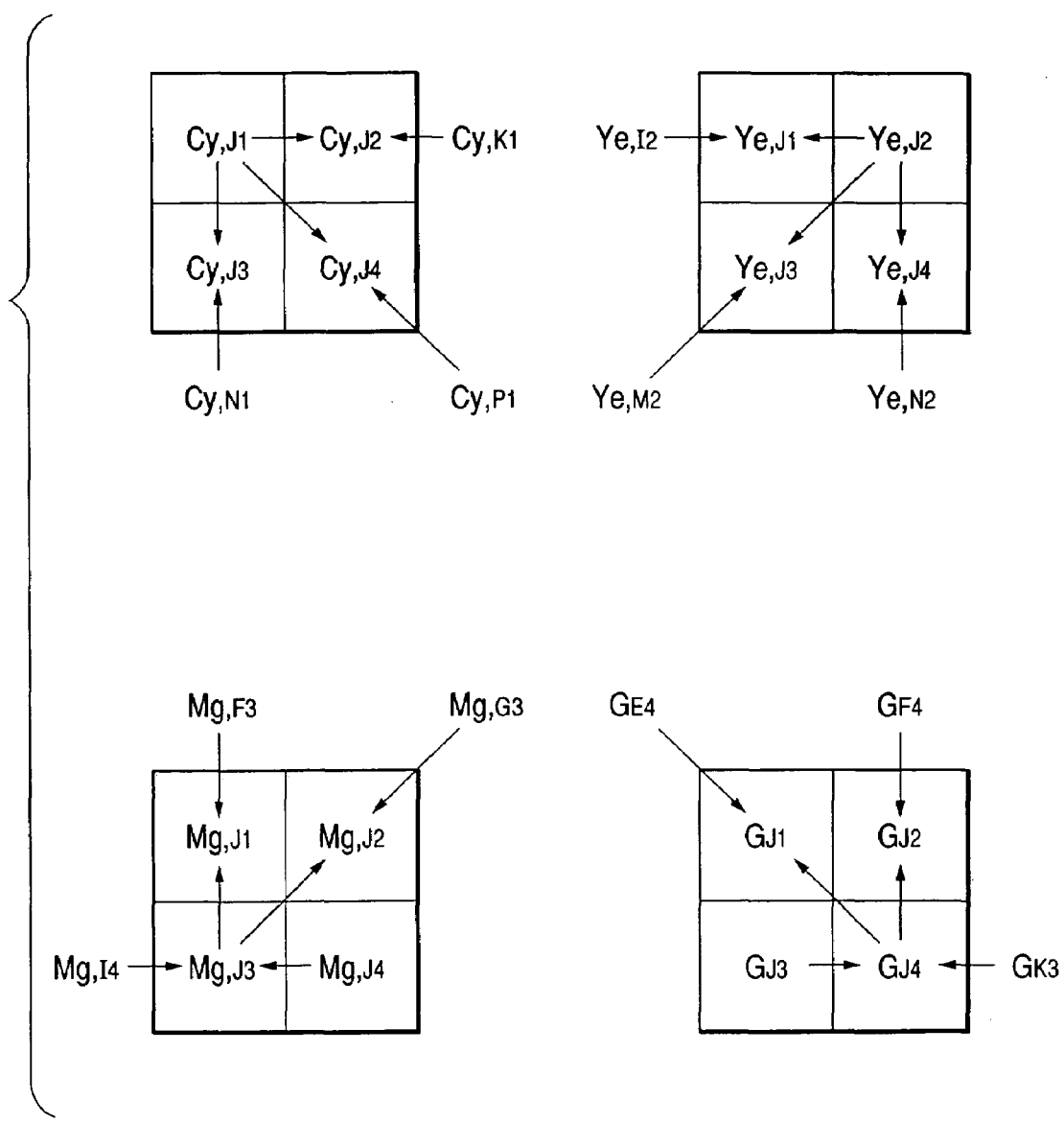
FIG. 9 is a second view for explaining interpolation processing according to the second embodiment of the present invention.
Figure 10:
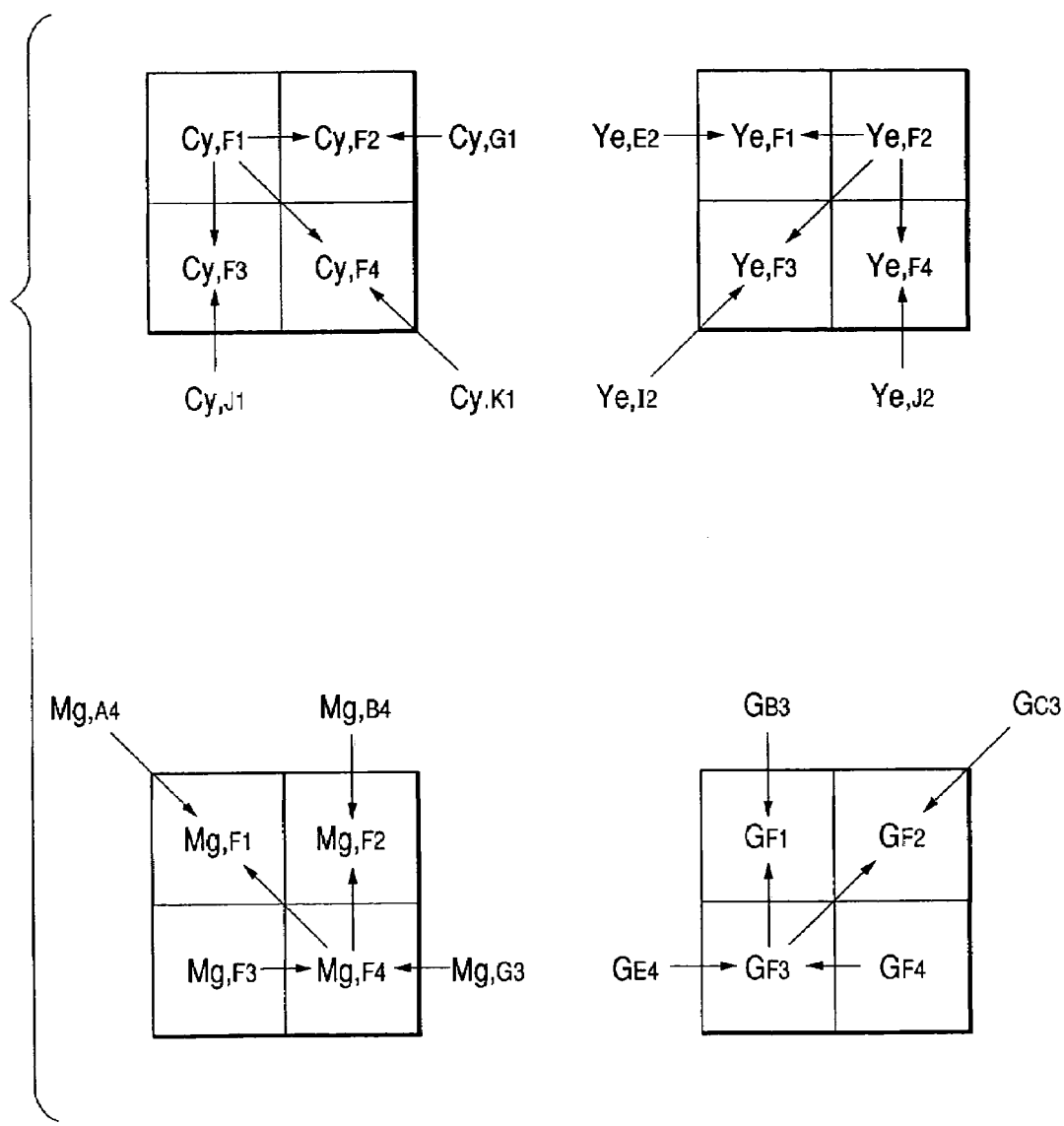
FIG. 10 is a third view for explaining interpolation processing according to the second embodiment of the present invention.

FIGS. 9 and 10 are views for explaining interpolation processing by an interpolation circuit 103. FIG. 9 shows interpolation processing for basic blocks at an upper portion 201 of the basic pattern shown in FIG. 7. FIG. 10 shows interpolation processing for basic blocks at a lower portion 202 of the basic pattern shown in FIG. 7. Referring to FIG. 8, the basic blocks A, B, C, D, I, J, K, and L correspond to the upper portion 201, and the basic blocks E, F, G, H, M, N, P, and Q correspond to the lower portion 202.

For the basic blocks at the upper portion 201, the interpolation circuit 103 generates interpolated pixels pointed by arrowheads in FIG. 9 on the basis of the original pixels stored in the block memory 102, which are indicated by reference numeral 40 in FIG. 8, in accordance with the following equations exemplifying the basic block J:

$Cy_{J2}=(Cy_{J1}+Cy_{K1})/2$ $Cy_{J3}=(Cy_{J1}+Cy_{N1})/2$ $Cy_{J4}=(Cy_{J1}+Cy_{P1})/2$ $Ye_{J1}=(Ye_{I2}+Ye_{J2})/2$ $Ye_{J3}=(Ye_{J2}+Ye_{M2})/2$ $Ye_{J4}=(Ye_{J2}+Ye_{N2})/2$ $Mg_{J3}=(Mg_{I4}+Mg_{J4})/2$ $Mg_{J1}=(Mg_{F3}+Mg_{J3})/2$ $Mg_{J2}=(Mg_{G3}+Mg_{J3})/2$ $G_{J4}=(G_{J3}+G_{K3})/2$ $G_{J1}=(G_{E4}+G_{J4})/2$ $G_{J2}=(G_{F4}+G_{J4})/2$

For the basic blocks at the lower portion 202, the interpolation circuit 103 generates interpolated pixels pointed by arrowheads in FIG. 10 on the basis of the original pixels stored in the block memory 102, which are indicated by reference numeral 50 in FIG. 8, in accordance with the following equations exemplifying the basic block F:

$Cy_{F2}=(Cy_{F1}+Cy_{G1})/2$ $Cy_{F3}=(Cy_{F1}+Cy_{I1})/2$ $Cy_{F4}=(Cy_{F1}+Cy_{K1})/2$ $Ye_{F1}=(Ye_{E2}+Ye_{F2})/2$ $Ye_{F3}=(Ye_{F2}+Ye_{J2})/2$ $Ye_{F4}=(Ye_{F2}+Ye_{J2})/2$ $Mg_{F4}=(Mg_{F3}+Mg_{G3})/2$ $Mg_{F1}=(Mg_{A4}+Mg_{F4})/2$ $Mg_{F2}=(Mg_{B4}+Mg_{F4})/2$ $G_{F3}=(G_{E4}+G_{F4})/2$ $G_{F1}=(G_{B3}+G_{F3})/2$ $G_{F2}=(G_{C3}+G_{F3})/2$

The interpolation circuit 103 switches the two interpolation modes in accordance with the type of basic blocks. The original pixels are read from an image pickup element 101 and written in the block memory in the same manner as in the first embodiment.

By repeating the block reading and interpolation, the interpolation circuit 103 outputs interpolated CyMgYe signals in the order of, e.g., the basic blocks F, G, H, . . . , J, K, L, . . . , N, P, Q, . . . . However, the basic block output order is not limited to this. For example, when the DCTs of 8×8 pixels are to be calculated on the output side of the signal processing circuit, the signals can be read in the order of the basic blocks F, G, J, K, . . . to continuously output 8×8 pixel data.

Figure 11:
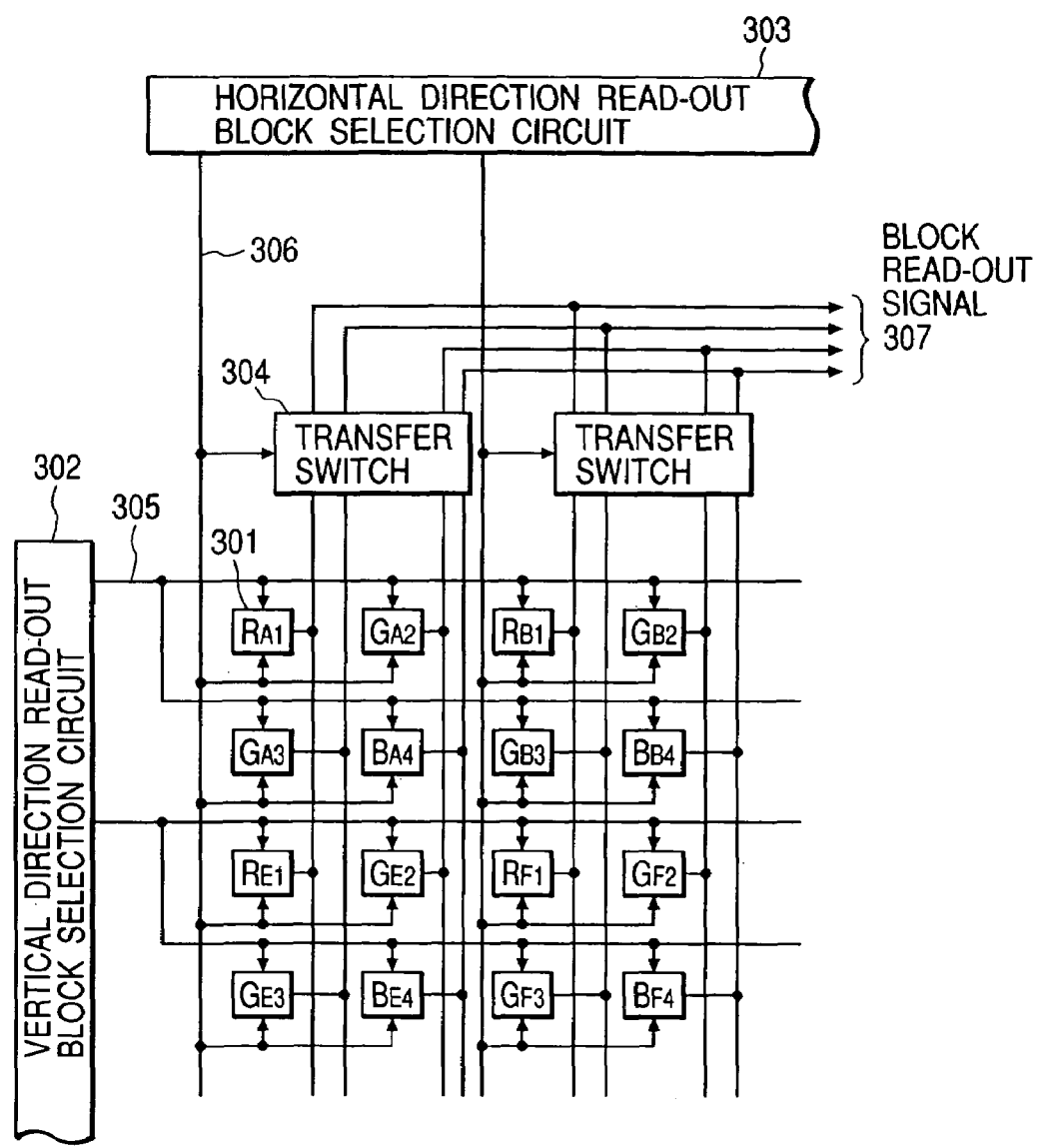
FIG. 11 is a block diagram showing the arrangement of an image pickup element according to the third embodiment of the present invention.

The arrangement of the image pickup element 101 will be described next. FIG. 11 is a block diagram showing the arrangement of an image pickup element 101 in the third embodiment.

Referring to FIG. 11, the image pickup element comprises photodetectors 301 such as photodiodes, a vertical direction (row direction) read-out block selection circuit 302, a horizontal direction (column direction) read-out block selection circuit 303, transfer switches 304, vertical direction block selection lines 305, horizontal direction block selection lines 306, and output lines 307. The output lines are connected to an output terminal.

For the vertical direction block selection lines 305 equal in number to the basic blocks in the vertical direction, the vertical direction read-out block selection circuit 302 activates only lines of selected blocks. Similarly, for the horizontal direction block selection lines 306 equal in number to the basic blocks in the horizontal direction, the horizontal direction read-out block selection circuit 303 activates only lines of selected blocks. Each photodetector 301 outputs a detection signal only when both the vertical direction block selection line 305 and horizontal direction block selection line 306 are activated. Each of the transfer switches 304 equal in number to the basic blocks in the horizontal direction receives the detection signal when any one of the basic blocks 301 of a line to which the transfer switches 304 belong outputs a detection signal. The outputs from the transfer switches 304 are coupled and sent to the output terminal. Since one of the outputs is selected by the horizontal direction block selection lines 306, only the detection signal from the basic block selected by the vertical direction block selection line 305 and horizontal direction block selection line 306 is output from the output terminal.

When the vertical direction read-out block selection circuit 302 and horizontal direction read-out block selection circuit 303 are simultaneously operated, the detection signal from an arbitrary basic block can be output from the output terminal.

Figure 12:
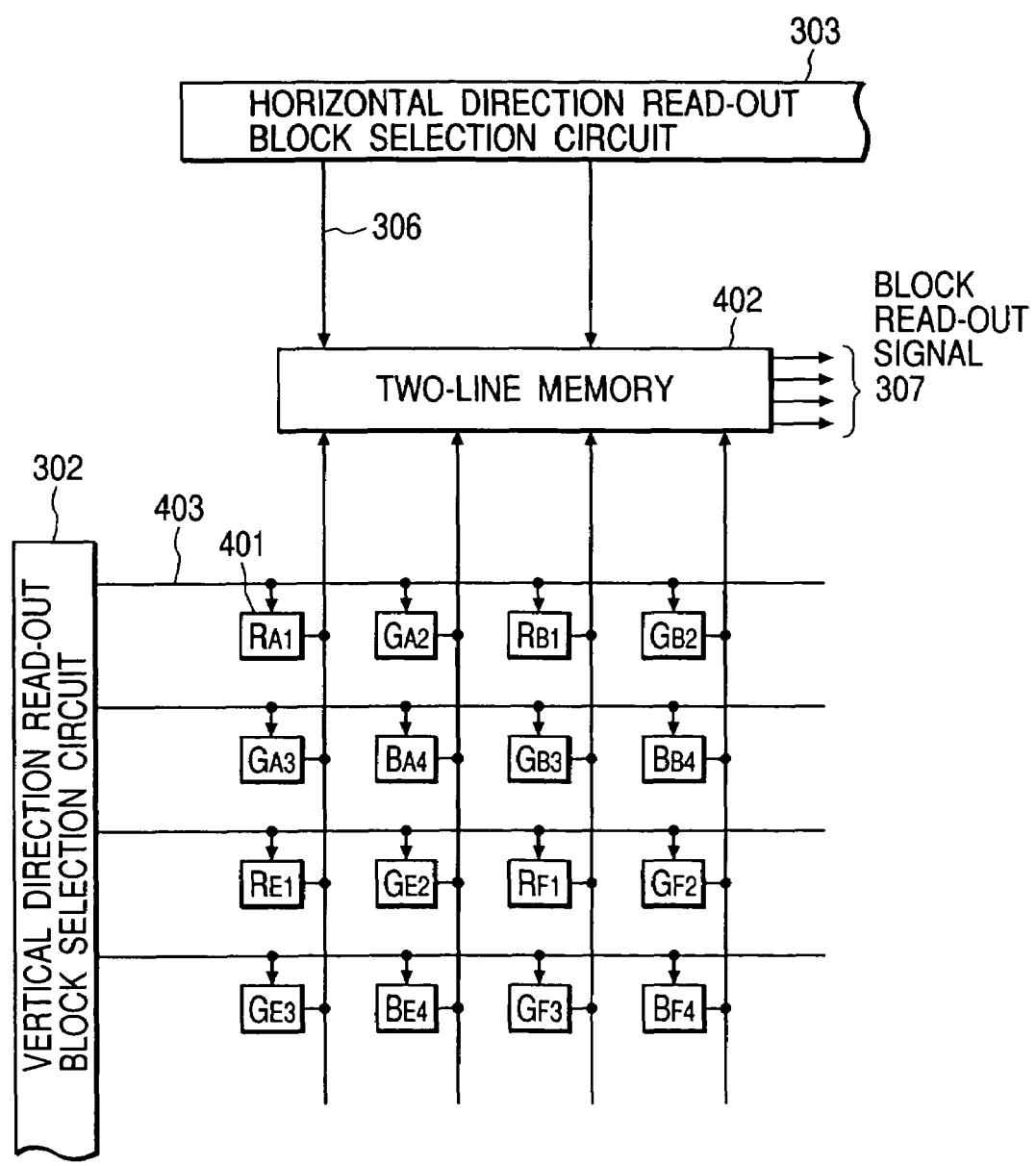
FIG. 12 is a block diagram showing the arrangement of an image pickup element according to the fourth embodiment of the present invention.

FIG. 12 is a block diagram showing the arrangement of an image pickup element 101 according to the fourth embodiment.

Referring to FIG. 12, the device comprises photodetectors 401 such as photodiodes, a vertical direction (row direction) read-out block selection circuit 302, a horizontal direction (column direction) read-out block selection circuit 303, a two-line memory 402, vertical direction photodetector selection lines 403, horizontal direction block selection lines 306, and output lines 307. The output lines are connected to an output terminal. The vertical direction read-out block selection circuit 302, horizontal direction read-out block selection circuit 303, vertical direction block selection lines 305, and horizontal direction block selection lines 306 are the same as those of the third embodiment.

For the vertical direction photodetector selection lines 403 equal in number to the photodetectors in the vertical direction, the vertical direction read-out block selection circuit 302 activates only lines of selected blocks. Since the outputs from photodetectors on one line are output to the same line, the lines are sequentially activated. For the horizontal direction block selection lines 306 equal in number to the basic blocks in the horizontal direction, the horizontal direction read-out block selection circuit 303 activates only lines of selected blocks. Each photodetector 401 outputs a detection signal only when a corresponding vertical direction photodetector selection line 403 is activated. The two-line memory 402 sequentially receives the outputs from basic blocks selected in the vertical direction. The two-line memory 402 outputs the signal of a basic block selected by a horizontal direction block selection line 306. Hence, only the detection signals from basic blocks selected by the vertical direction photodetector selection lines 403 selected by the vertical direction read-out block selection circuit 302, and the horizontal direction block selection lines 306, are output from the output terminal.

When the vertical direction read-out block selection circuit 302 and horizontal direction read-out block selection circuit 303 are simultaneously operated, the detection signal from an arbitrary basic block can be output from the output terminal.

As has been described above, according to the first to fourth embodiments, since photodetection signals are read from the image pickup elements in units of basic blocks, basic blocks necessary for interpolation processing are stored in the block memory, and interpolated pixels of the respective colors are obtained on the basis of the photodetection signals stored in the block memory, an interpolated signal of each color in an arbitrary region can be obtained at random.

In addition, since all signal processing operations can be performed as analog processing, the A/D and D/A converters can be omitted. Therefore, the circuit scale can be reduced.

Furthermore, since the image pickup element, block memory, interpolation circuit, and signal processing circuit can be formed on one chip by the same process, a one-chip image pickup device can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color image pickup device formed on a single semiconductor chip comprising:

an image pickup element, including a two-dimensional array of photodetectors each having a respective color filter, and a reading circuit for sequentially accessing basic block units each comprising at least a two by two array of the photodetectors in said two-dimensional array, to read out analog image data from the basic block units;

a block storage circuit for storing analog image data sent in parallel by the reading circuit from a target basic block unit of the photodetectors, and from the basic block units of photodetectors neighboring the target basic block unit, wherein the number of stored analog image data bits is smaller than the number of photodetectors included in the image pickup element;

an interpolation circuit, which is operable upon the analog image data stored in said block storage circuit, to perform interpolation for each one of the photodetectors of the target basic block on the basis of the stored analog image data read out from adjacent photodetectors having color filters of the same respective colors, wherein after a termination of the interpolation for each of the photodetectors of the target basic block unit, in order to perform the interpolation for the next target basic block unit, the block storage circuit performs the storing of the analog image data to replace the analog image data of the basic block units of the photodetectors neighboring the target basic block unit with the analog image data of other basic block units of the photodetectors neighboring the next target basic block unit; and a signal processing circuit for receiving analog image data outputted from the interpolation circuit, for subjecting the analog image data to a processing of at least one of color gain adjustment, low-frequency filtering, and edge enhancement, and for outputting processed analog image data as the output of the color image pickup device, wherein the block storage circuit, the interpolation circuit, and the signal processing circuit are formed on one semiconductor chip together with the image pickup element.

2. A device according to claim 1, wherein each basic block unit is formed of 2×2 photodetectors.

3. A device according to claim 2, wherein said color filters are of color red, green, and blue, respectively, and each basic block unit is a 2×2 block of a Bayer matrix.

4. A device according to claim 2, wherein said color filters are of color Cyan, Magenta, Yellow, and Green and each basic block unit is a 2×2 block partition of the basis 4×2 pattern of a complementary color filter array.

5. A device according to claim 2, wherein said block storage means stores image data of 3×3 basis block units.

* * * * *